United States Patent [19]
Adell

[11] Patent Number: 5,237,306
[45] Date of Patent: Aug. 17, 1993

[54] SIGNALLING SYSTEM FOR REQUESTING A DRIVER OF A MOTOR VEHICLE TO DIM OR TURN ON HIS VEHICLE'S HEADLIGHTS

[76] Inventor: Robert Adell, 31800 S. Brandingham, Franklin, Mich. 48025

[21] Appl. No.: 808,174

[22] Filed: Dec. 13, 1991

[51] Int. Cl.$^5$ .............................................. B60Q 1/26
[52] U.S. Cl. .................................. 340/469; 340/471; 340/472
[58] Field of Search ............... 340/468, 469, 470, 471, 340/472

[56] References Cited

U.S. PATENT DOCUMENTS

| | | | |
|---|---|---|---|
| 2,655,642 | 10/1953 | Ayres et al. ......................... | 340/471 |
| 3,217,292 | 1/1963 | Henderson ......................... | 340/470 |
| 3,434,107 | 10/1966 | Pfund ................................. | 340/472 |
| 3,439,326 | 1/1967 | Boudin .............................. | 340/472 |
| 4,734,697 | 3/1988 | Robinson et al. .................. | 340/469 |

FOREIGN PATENT DOCUMENTS

| | | | |
|---|---|---|---|
| 0505883 | 6/1952 | Canada ............................... | 340/106 |
| 3332998 | 3/1985 | Fed. Rep. of Germany ...... | 340/468 |

*Primary Examiner*—Jin F. Ng
*Assistant Examiner*—Nina Tong
*Attorney, Agent, or Firm*—Alex Rhodes

[57] ABSTRACT

A system for improving vehicle safety and reducing driver stress by signalling drivers of oncoming vehicles and vehicles behind a vehicle to dim or turn on their vehicle's headlights. The signalling system comprises a front signalling light, a rear signalling light and a control system. The signalling lights are focused and aimed in the direction of drivers of oncoming vehicles and vehicles behind a vehicle to gain their attention without disturbing other drivers. A series of flashing light beams are transmitted in a controlled manner to distinguish the lights from other vehicle and traffic lights. The signalling system is activated by a switch which is located adjacent to a driver's hand to reduce the time for activating the system. The system has two operating states, one state where the signalling lights are timed to flash "on" and "off" for a predetermined amount of time and another state where the signalling lights flash continuously "on" and "off". Several embodiments are disclosed to illustrate the broad scope of the invention.

49 Claims, 14 Drawing Sheets

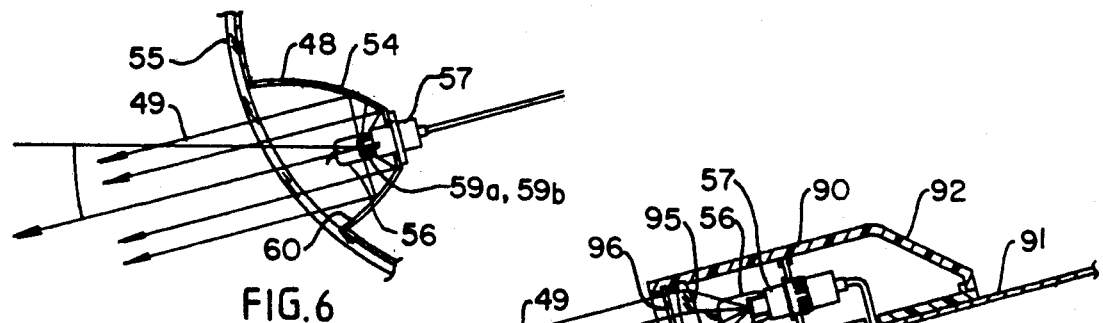
FIG. 6
FIG. 9
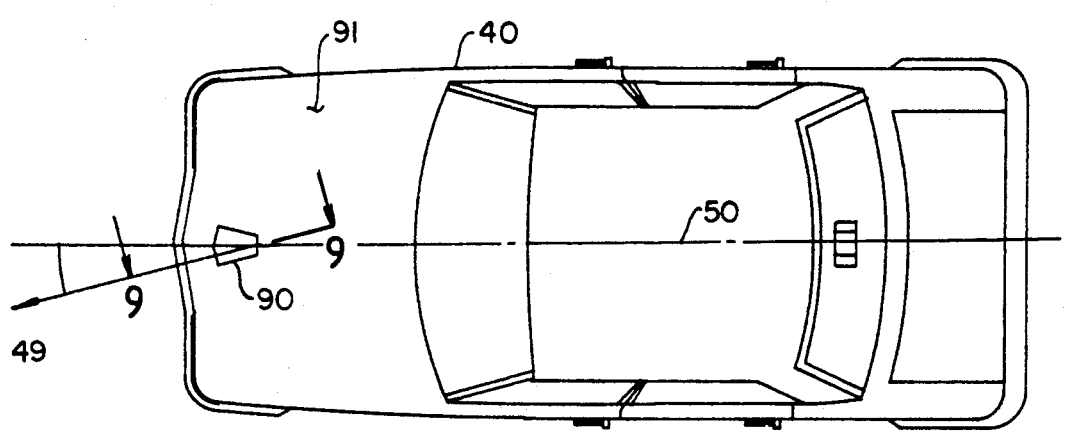
FIG. 7
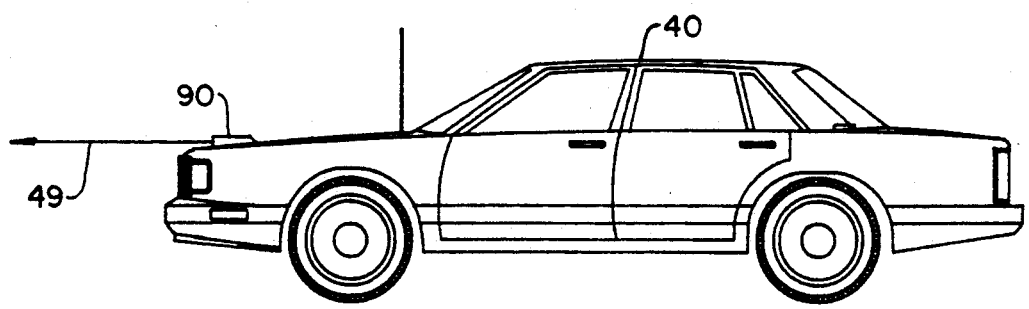
FIG. 8

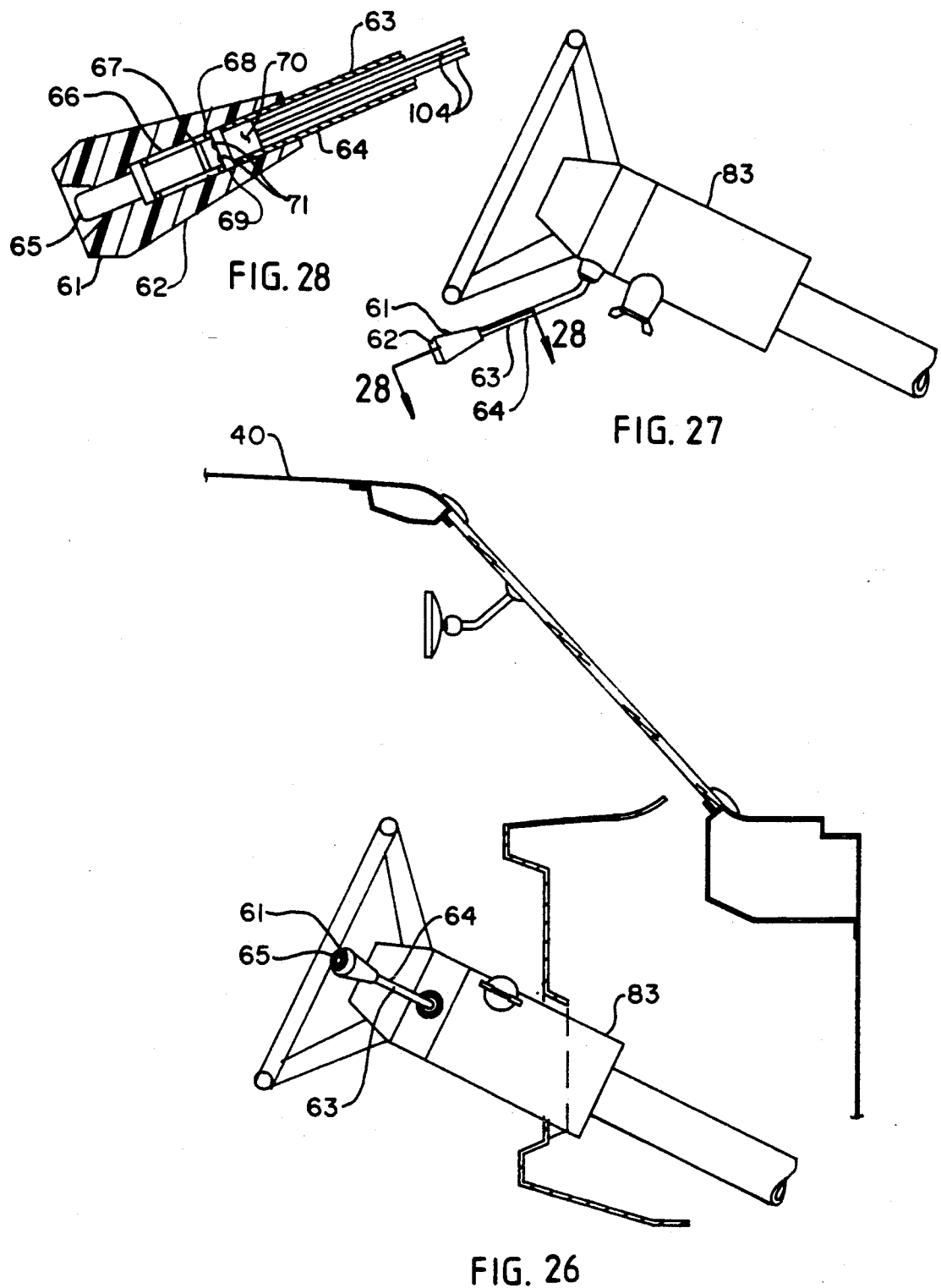

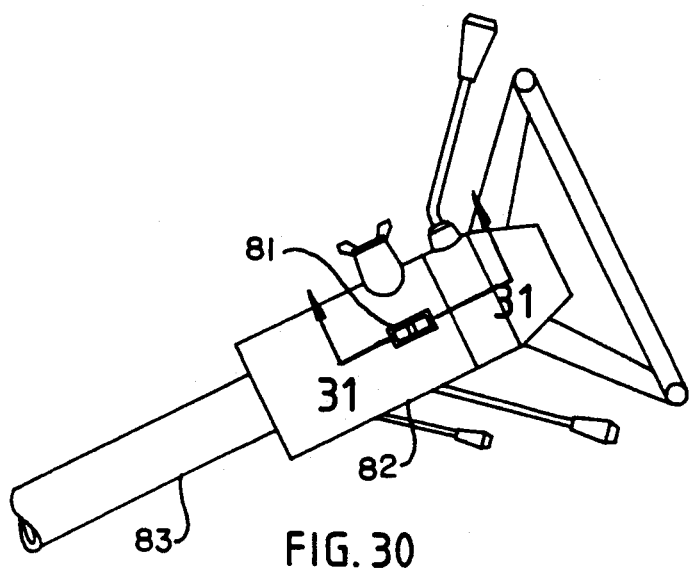
FIG. 30
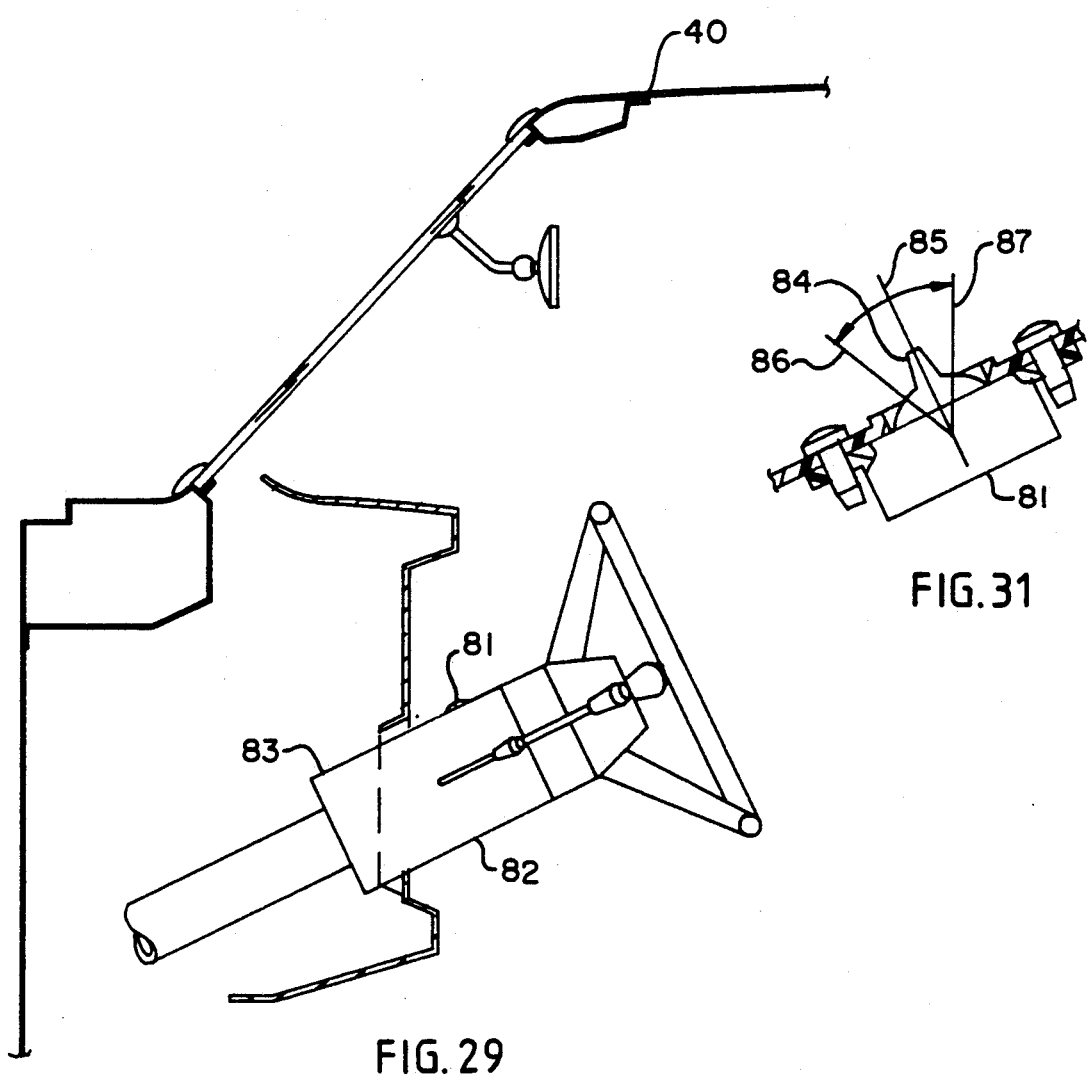
FIG. 31
FIG. 29

SIGNALLING SYSTEM FOR REQUESTING A DRIVER OF A MOTOR VEHICLE TO DIM OR TURN ON HIS VEHICLE'S HEADLIGHTS

BACKGROUND OF THE INVENTION

This invention relates to a motor vehicle signalling system and more particularly to a signalling and control system for improving vehicle safety and reducing driver stress.

Excessive glare from oncoming vehicles and vehicles travelling behind vehicles is annoying, affects vehicle safety, and causes driver stress. Headlight glare or the failure to turn on headlights can cause serious accidents, especially at high highway driving speeds, in dark winding residential neighborhoods, and conditions of low visibility, such as fog, dust storms, rain and snow. There are no engineered vehicle systems available for signalling drivers to dim or turn on their vehicles' headlights. Drivers attempt to signal others to dim or turn on headlights by flashing their vehicles' headlights "on" and "off" or their high beam headlights "on" and off", too often with little or no success.

The problem of excessive glare is increasing rather than decreasing for the following reasons. Pick-up truck and sport vehicle sales are steadily increasing. Headlights of pick-up trucks and sport vehicles produce more glare than passenger vehicles because of their higher positions and are especially annoying on hills due to angular changes in headlight beams. Furthermore, advances in vehicle lighting, such as halogen lights and improved headlight optics have increased headlight illumination and consequently headlight glare.

Headlight glare from vehicles travelling behind vehicles is generally more annoying and fatiguing than glare from oncoming vehicles. This is so because headlight glare from rearward vehicles generally persists for much longer periods of time than glare from oncoming vehicles. However, it should be kept in mind that headlight glare from a rearward vehicle is also annoying and more threatening to oncoming vehicles.

Vehicle manufacturers have recognized that headlight glare from vehicles travelling behind vehicles is a problem by equipping vehicles with "day and night" rear view mirrors. Although "day and night" mirrors reduce glare, they also act to reduce night vision. Moreover, they are ineffectual for reducing glare from oncoming vehicles and glare from reflections off of side view mirrors. Furthermore, many truckers are unable to reduce glare from side view mirrors because many truck side view mirrors cannot be adjusted during driving because they require special wrenches for adjustment. Manufacturers have attempted to provide a solution for glare from oncoming vehicles by offering automatic headlight dimmers. However, automatic headlight dimmers have been unsuccessful and taken off the market.

The current practice of signalling an oncoming vehicle by switching a vehicle's headlights or "high beams" "on" and "off" has several undesirable consequences. One undesirable consequence is that the wide illumination field of a vehicle's headlights is annoying and dangerous to drivers of other oncoming vehicles and vehicles travelling ahead of the signalling vehicle. Another undesirable consequence is that this practice does not always gain the attention of the driver of the offending vehicle. Another undesirable consequence is that no uniform procedure exists for flashing a vehicle's headlights "on and off". Another undesirable consequence is that there is no control over the length of time for signalling the offending driver.

With the foregoing in mind, it is apparent that a need exists for a standardized, effective system for signalling a driver to dim or turn on his vehicle's headlights.

SUMMARY OF THE INVENTION

The present invention is related to U.S. Pat. No. 5,113,175 and U.S. Pat. No. 5,119,067 which are incorporated herein by reference.

The invention resides in features which individually and collectively contribute to its ability to signal drivers of oncoming vehicles and drivers of vehicles behind a vehicle equipped to dim or turn on their vehicles' headlights.

One benefit of the invention is that a uniform system is provided for signalling drivers to dim or turn on their vehicles' headlights. Another benefit, in addition to the foregoing benefit, is that the signalling system does not disturb or affect the safety of other drivers.

One feature of the invention is that a control for activating the signalling system is provided which is immediately available to a driver.

Another feature of the invention is that signals are provided for requesting drivers to dim or turn on their vehicles' headlights which are distinguishable from other vehicle and traffic lights.

Another feature of the invention is that a system is provided for signalling drivers of both oncoming vehicles and vehicles travelling behind a signalling vehicle to dim or turn on their vehicles' headlights.

In accordance with the present invention, a front signalling light is mounted on the front of a vehicle which transmits a flashing light beam forwardly and outwardly from the vehicle in the direction of an oncoming vehicle and a rear signalling light is mounted on the rear of the vehicle to transmit a flashing light beam rearwardly to request drivers to dim or turn on their vehicles' headlights. In a first aspect of the invention, the low and high intensity signalling lights are mounted in the left front corner of a vehicle and on the center of the rear deck lid of the vehicle. When the signalling system is activated, a flashing light beam is transmitted in the direction of an oncoming vehicle or a rearward vehicle to request a driver to dim or turn on his vehicle's headlights. The front signalling light is directed angularly away from the longitudinal vehicle axis and the rear signalling lights are directed parallel to the longitudinal axis to point in the direction of drivers of the oncoming and rearward vehicles without disturbing other drivers. A control system is provided to selectively operate the front and rear signalling lights. The control system is activated by a driver switch mounted on the steering column which is immediately available to the driver.

Other embodiments of the invention are disclosed comprising signalling lights mounted at optional vehicle locations and/or flashing colored light beams to illustrate the broad scope of my invention.

The foregoing features and benefits, in addition to other features and benefits will become apparent from the ensuing detailed description taken in conjunction with the accompanying drawings. The best mode which is contemplated in practicing my invention is disclosed and the subject matter in which exclusive propertly rights are claimed is set forth in each of the numbered claims at the conclusion of the detailed description.

BRIEF DESCRIPTION OF THE DRAWINGS

FIG. 6 is an enlarged cross sectional view taken on the line 6—6 of FIG. 2.

FIG. 7 is a plan view of an alternate embodiment having a front signalling light mounted on the hood of a motor vehicle for signalling oncoming vehicles to dim or turn on their vehicles' headlights.

FIG. 8 is a left side view of the vehicle shown in FIG. 7.

FIG. 9 is an enlarged cross sectional view taken on the line 9—9 of FIG. 7.

FIG. 26 is a longitudinal cross sectional view of a vehicle steering column having a driver switch mounted in the knob of a transmission gear selector lever for activating a light for signalling drivers of vehicles behind the signalling vehicle to dim or turn on their vehicles' headlights.

FIG. 27 is an auxiliary view taken in the direction of arrow C in FIG. 26.

FIG. 28 is an enlarged cross sectional view taken on the line 28—28 of FIG. 27.

FIG. 29 is a cross sectional view of an alternate embodiment having a driver switch mounted in a vehicle steering column for activating front and rear lights for signalling oncoming drivers and drivers of vehicles behind the signalling vehicle to dim or turn on their vehicles' headlights.

FIG. 30 is an auxiliary view taken in the direction of arrow D in FIG. 29.

FIG. 31 is an enlarged cross sectional view taken on the line 31—31 of FIG. 30.

DETAILED DESCRIPTION OF THE PREFERRED EMBODIMENT

Figure 1:
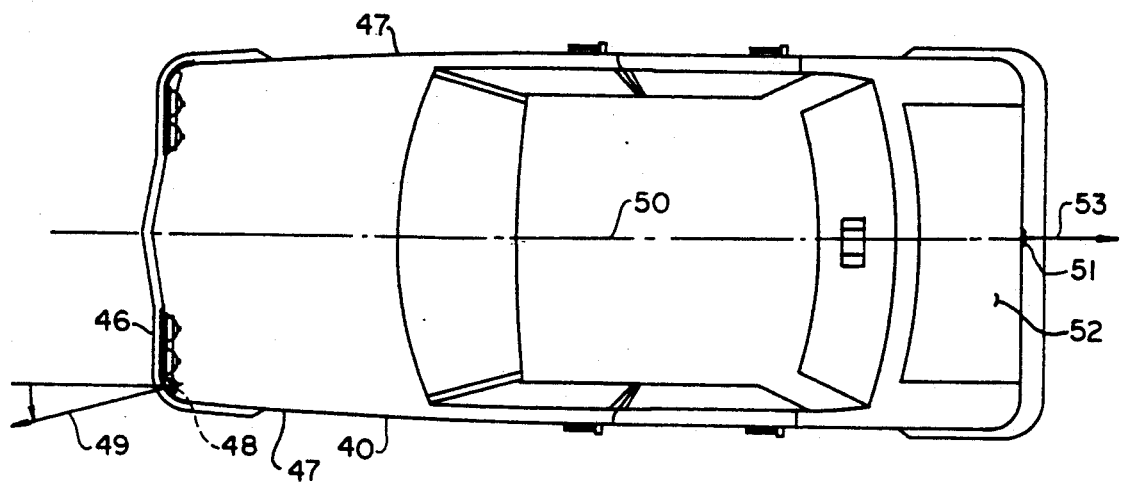
FIG. 1 is a plan view of a passenger vehicle having signalling lights on the front and rear of a vehicle for signalling drivers to dim or turn on their vehicles' headlights.
Figure 2:
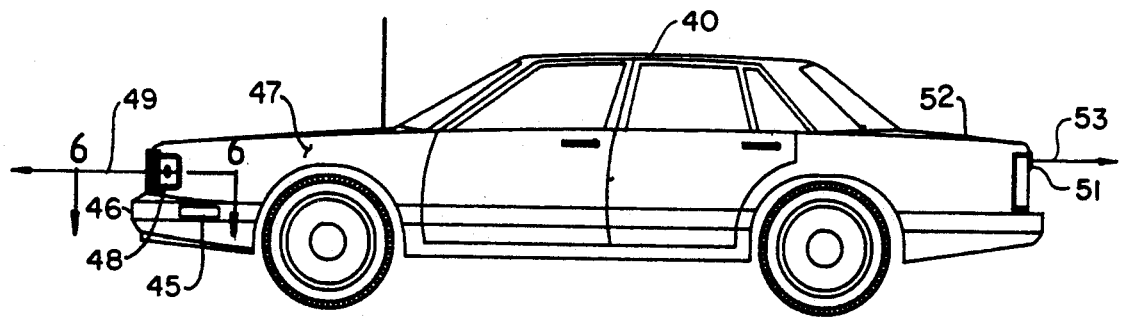
FIG. 2 is a left side view of the vehicle shown in FIG. 1.
Figure 3:
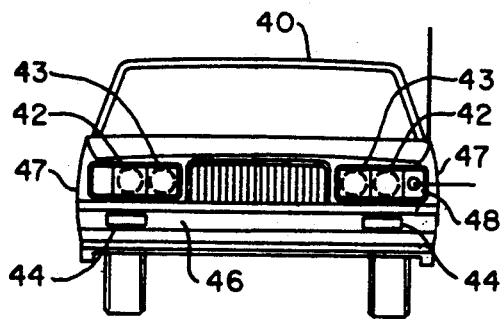
FIG. 3 is a front view of the vehicle shown in FIG. 1.
Figure 4:
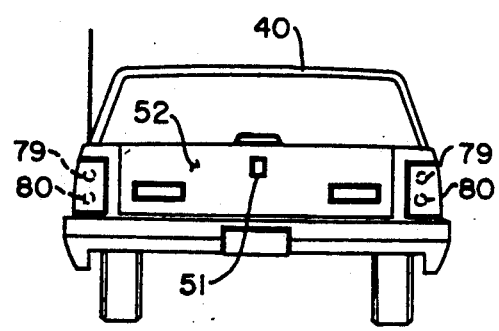
FIG. 4 is a rear view of the vehicle shown in FIG. 1.

Referring now to the drawings wherein like numerals designate like and corresponding parts throughout the several views, a typical passenger sedan, generally designated by the numeral 40, is shown which embodies my signalling system. A sedan is shown for the purpose of illustrating my invention, it being understood that my signalling system can be applied to all types and styles of motor vehicles, including, sedans, convertibles, motor homes, recreational vehicles, trailers, vans, trucks, motorcycles and the like.

With reference to FIGS. 1 through 5, inclusive, at the front of the sedan are pairs of low-beam headlights 42, high-beam (i.e. bright) headlights 43, parking/turn signal lights 44 and side marker lights 45. The low-beam headlights 42 are located at the outer end portions of the vehicle 40 and the high-beam headlights 43 are adjacent to and inward of the low-beam headlights 42. The parking/turn signal lights 44 are located in the vehicle's front bumper 46 below the headlights 42,43 and the side marker lights 45 are located in the sides of the front fenders 47. At the rear of the vehicle there are a pair of stop lights 79 and a pair of turn signal lights 80.

In the left front corner of the vehicle 40 there is a front signalling light 48 for requesting drivers of oncoming vehicles to dim or turn on their vehicles' headlights. The front signalling light 48 is aimed to gain the attention of a driver of an oncoming vehicle without disturbing drivers of other vehicles. This is accomplished by transmitting a signalling light beam 49 forwardly and outwardly away from the vehicle's longitudinal axis 50.

In the rear of the vehicle 40 there is a rear signalling light 51 mounted on the upper portion of the vehicle's deck lid 52. The rear signalling light 51 is aimed to project a light beam 53 parallel to the vehicle's longitudinal axis 50 to gain the attention of a driver of a vehicle behind the signalling vehicle 40 without disturbing drivers of other vehicles behind the signalling vehicle.

Figure 5:
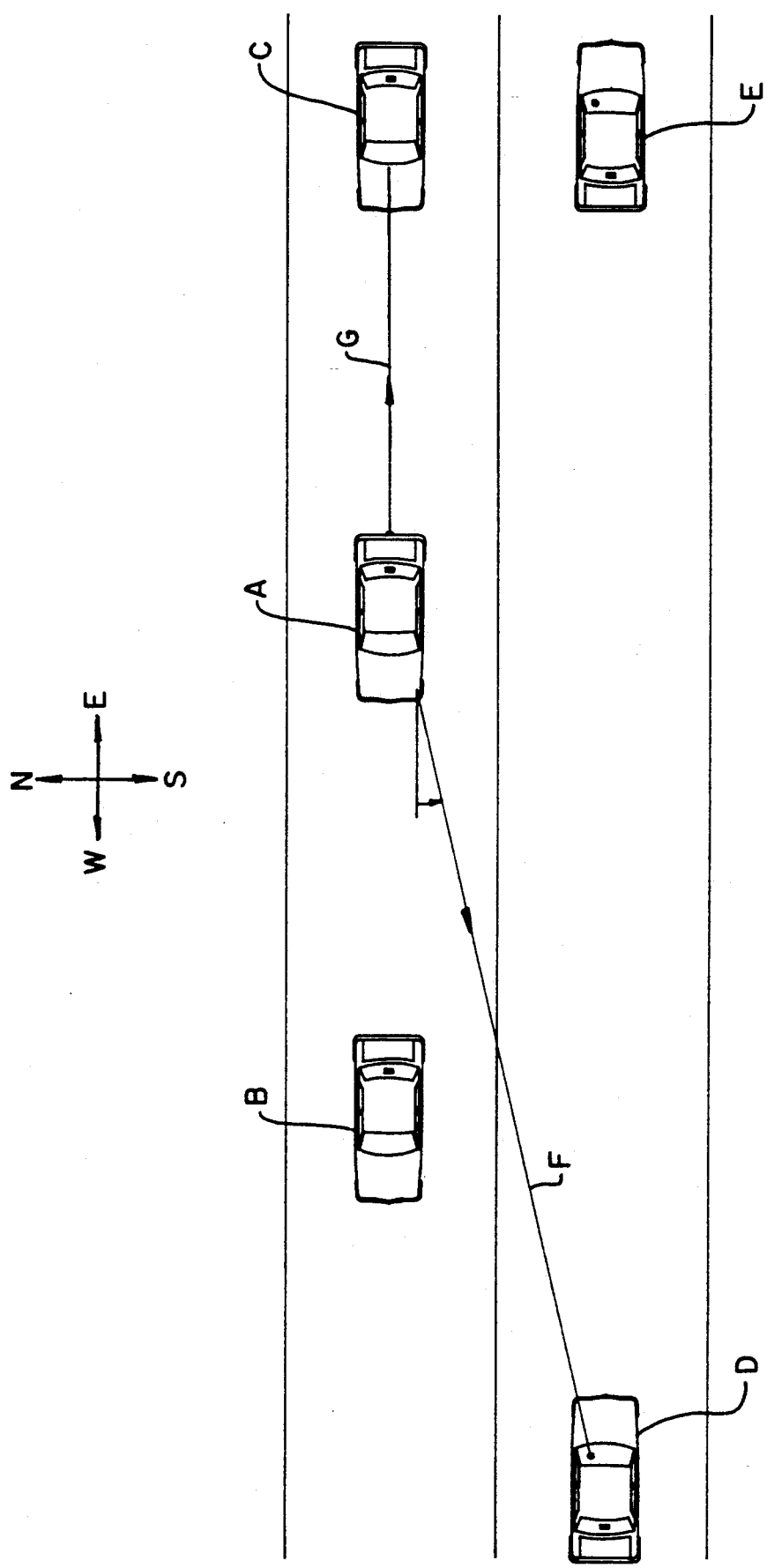
FIG. 5 is a plan view of a vehicle embodying my invention travelling on a highway with other vehicles.
Figure 10:
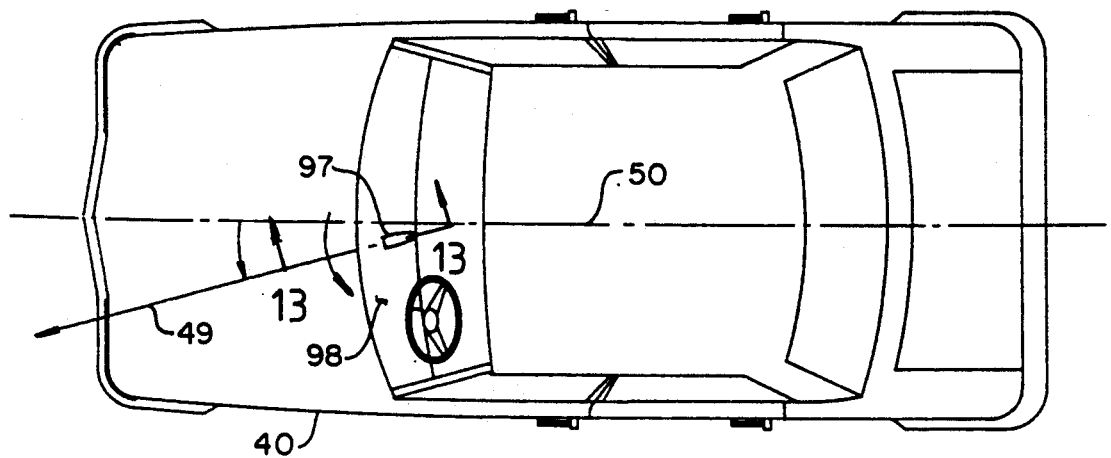
FIG. 10 is an alternate embodiment having a front signalling light rotatably mounted on the hood of a motor vehicle for signalling drivers of oncoming vehicles to dim or turn on their vehicles' headlights.
Figure 11:
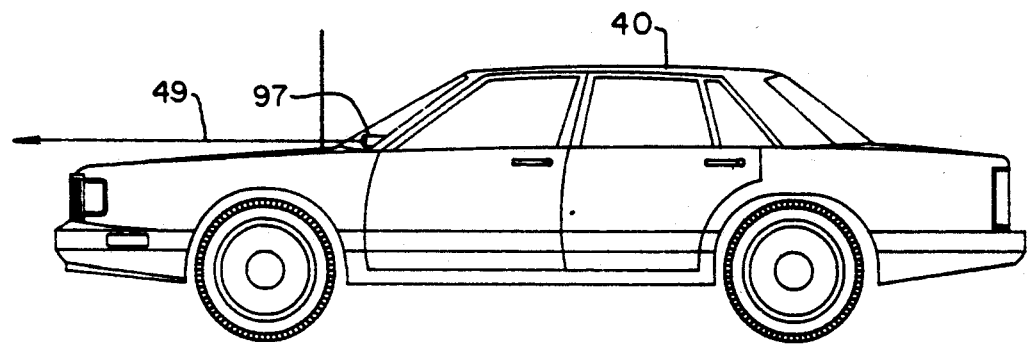
FIG. 11 is a left side view of the vehicle shown in FIG. 10.
Figure 13:
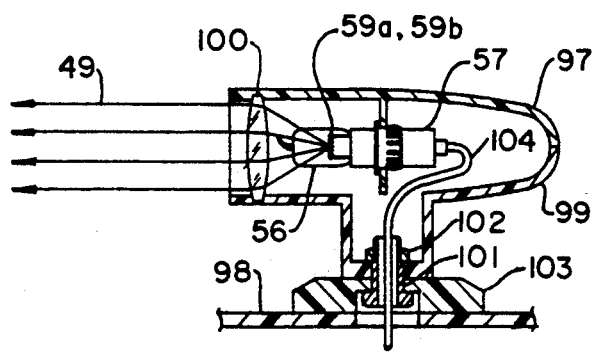
FIG. 13 is an enlarged cross sectional view taken on the line 13—13 of FIG. 10.
Figure 12:
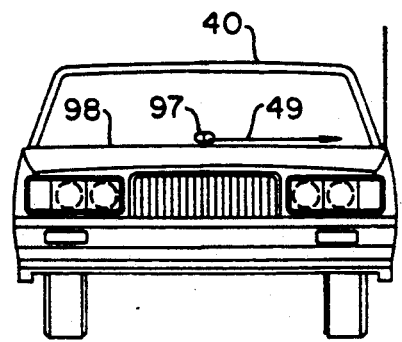
FIG. 12 is a front view of the vehicle shown in FIG. 10.
Figure 14:
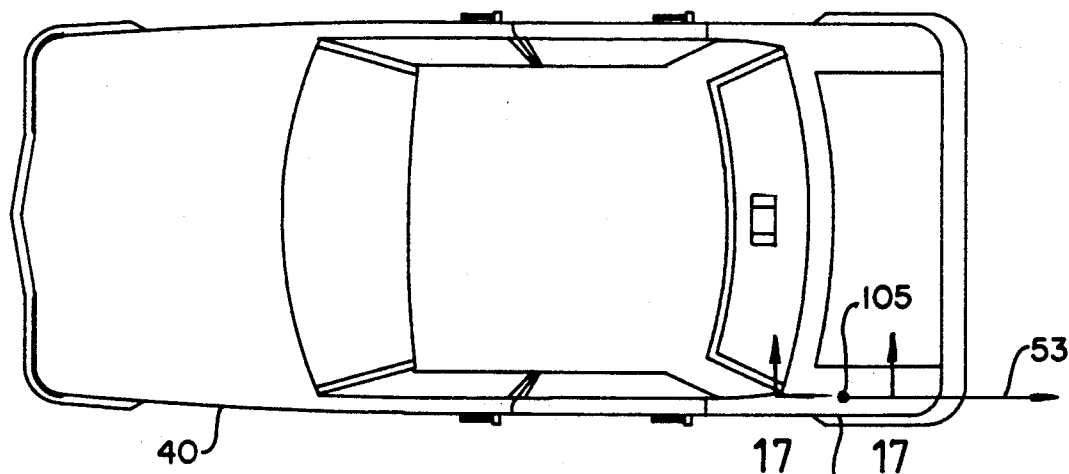
FIG. 14 is a plan view of an alternate embodiment having a signalling light telescopically mounted in the left rear quarter panel of a vehicle for signalling drivers of vehicles behind the signalling vehicle to dim or turn on their vehicle' headlights.
Figure 15:
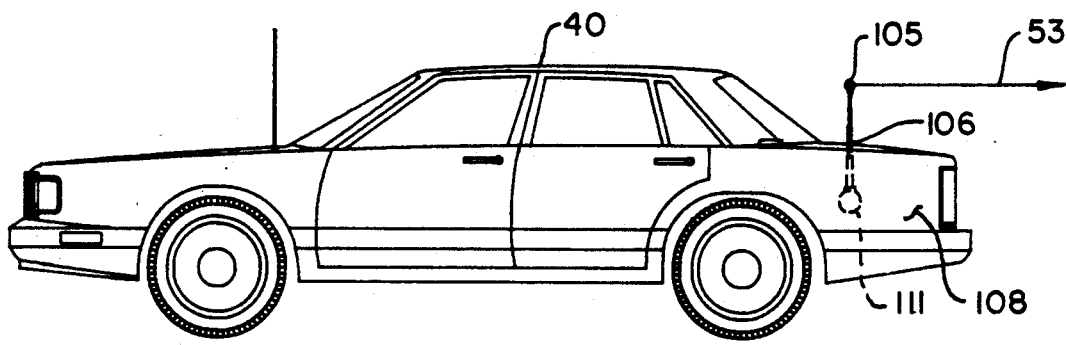
FIG. 15 is a left side view of the vehicle shown in FIG. 14.
Figure 16:
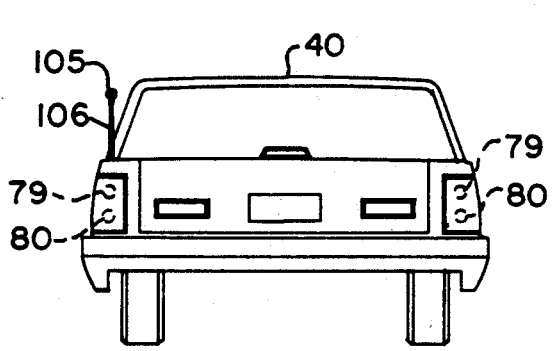
FIG. 16 is a rear view of the vehicle shown in FIG. 14.
Figure 17:
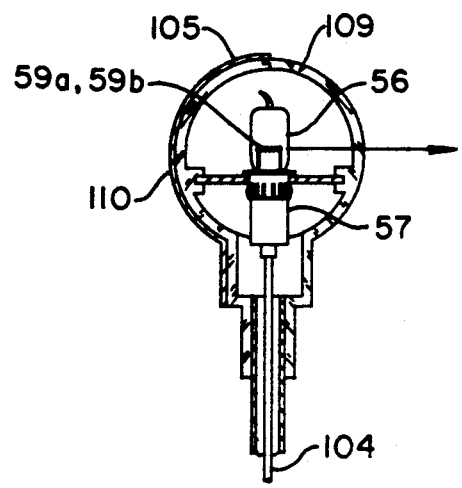
FIG. 17 is an enlarged cross sectional view taken on the line 17—17 of FIG. 14.

The effectiveness of my signalling system can be understood by reference to FIG. 5. Three vehicles are shown travelling in line in a westerly direction. The center vehicle, designated by the letter "A" is equipped with my signalling system. Vehicle "B" is travelling two car lengths ahead of vehicle "A" and vehicle "C" is travelling two car lengths behind vehicle "A". Vehicles "B" and "C" are travelling in the same direction as vehicle "A". On the opposite side of the highway two vehicles, designated by the letters "D" and "E", travel in line in an opposite easterly direction.

Assume that vehicle "D" has its high-beam headlights on which are disturbing the driver of vehicle "A" and that vehicle "C" also has its high-beam headlights on which are disturbing the driver of vehicle "A". The driver of vehicle "A" activates his vehicle's signalling system and transmits a flashing focused light beam 49 at an angle, preferably within a range of 0 to 30 degrees with respect to the longitudinal axis of vehicle "A" to request the driver of oncoming vehicle "D" to dim his headlights. The signalling light beam is transmitted along the axis "F" across the highway to request the driver of vehicle "D" to dim his vehicle's headlights.

It will be observed that the forwardly transmitted signalling light beam is pointed toward the driver of vehicle "D" without disturbing the driver of vehicle "B". Driver "A" then activates his vehicle's signalling system to transmit a flashing focused light beam along an axis "G" which is preferably parallel to the longitudinal axis of vehicle "A" to request the driver of vehicle "C" to dim his vehicle's headlights. It will be further observed that the rearwardly transmitted signalling light beam is directed toward vehicle "C" without disturbing the driver of vehicle "E".

The construction of the front signalling light 48 is depicted in FIG. 6. The front signalling light 48 is comprised of a housing 54 open at one end, a lens 55 for covering the open end, an electric lamp 56 and a socket 57 mounted in the housing 54 for receiving the electric lamp 56. The electric lamp 56 is conventional and has a pair of filaments, a filament 59a for transmitting a low intensity light beam and a filament 59b for transmitting a high intensity light beam. As will be later described, the low and high intensity beams combine to transmit a single flashing high intensity beam 49. In the alternative, a pair of conventional electric lamps (not shown) can be used, one for transmitting a low intensity light beam and one for transmitting a high intensity light beam. The electric lamp 56 is preferably a halogen type lamp capable of transmitting a high intensity light beam over a large distance to gain the attention of a driver. The housing 54 has a parabolic shape reflector portion 60 for focusing the signalling light beam 49.

The front signalling light 48 is activated by a driver's switch 61 mounted at the end of a transmission gear selector lever assembly 63, as shown in FIGS. 26 through 28, inclusive. The switch 61 is a spring biased normally open single pole single throw (SPST) switch 61. It is comprised of the plastic transmission selector lever knob 62, a tubular transmission selector lever 64, a plastic push button 65 slideably mounted in an aperture 66 which extends through the center of the knob 62, an upper contact 67 attached to the lower portion of the push button 65, coil spring 68 for biasing the button 65 outwardly, and a lower contact assembly 69. The lower contact assembly 69 is comprised of an insulator 70 and a pair of contacts 71 attached to the insulator 70. When the push button 65 is depressed, the upper contact 67 crosses the pair of contacts 71 of the lower contact assembly 69 to complete a control circuit hereinafter described. The end portion of the knob 62 is recessed for positioning the outer end of the push button 65 below the end of the knob 62 to prevent accidental activation of the front signalling light 48.

Figure 33:
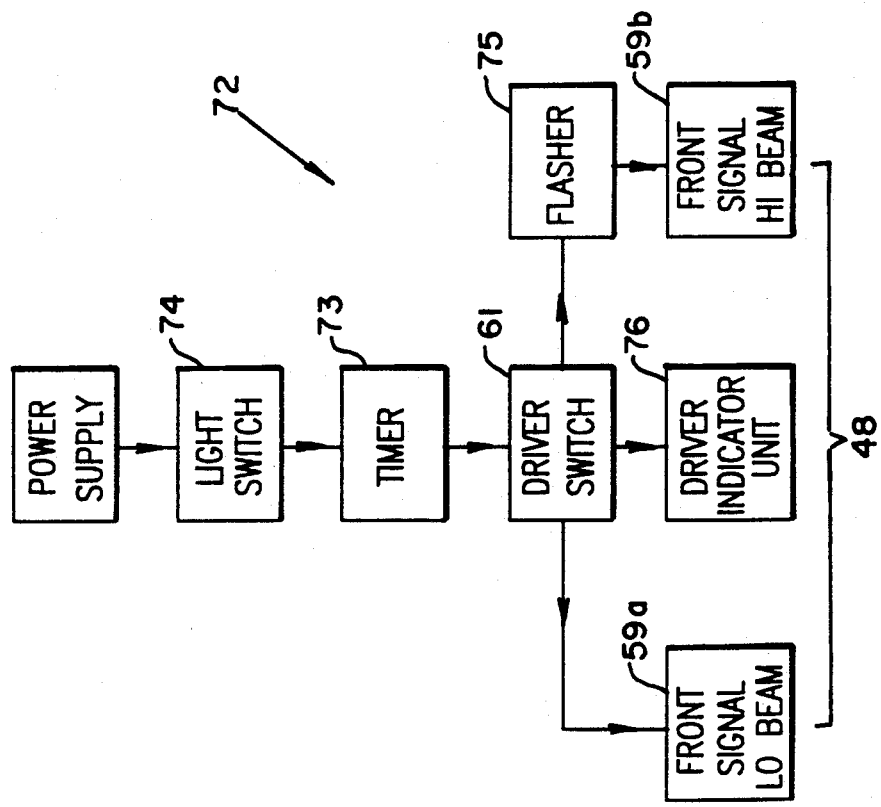
FIG. 33 is a block diagram of a control system for operating a front signalling light to signal drivers of oncoming vehicles to dim or turn on their vehicles' headlights.

A control circuit 72 for operating the front signalling light 48 is shown in FIG. 33. The control circuit 72 is operational only when the headlights 42,43 are on and includes a timer 73 wired in series with the vehicle's headlight switch 74. Alternatively, the timer 73 can be wired in series to the vehicle's ignition switch (not shown) to permit operation of the front signalling light 48 when the headlights 42,43 are not on. When the push button 65 is momentarily depressed and released, the switch 61 returns to its normally off position and the timer 73 supplies current to allow the front signalling light 48 to emit signals for a predetermined interval of time. If the push button 65 is held by the driver in the depressed position, the signalling light 48 continues to emit signals until the button 65 is released and the timer 73 stops supplying current. The spring biased switch 61 simplifies the operation of the system and prevents the signalling light 48 from being inadvertently left active.

When the system is operative, the low intensity filament (LO BEAM) 59a receives current from the driver's switch 61 and the high intensity filament (HI BEAM) 59b receives current via a flasher unit 75 which is in series with the driver's switch 61. While the system is operating, the low intensity filament 59a remains on and the high intensity filament 59b is flashed "on" and "off". Thus, a flashing focused high intensity light beam is transmitted and pointed directly at the driver of the oncoming vehicle to gain his immediate attention. The driver indicating unit 76 shown in FIG. 33 consists of a conventional indicator light (not shown) and/or a conventional audible signal device (not shown). The indicating unit 76 informs the driver that the front signalling system is operating.

Referring now to FIGS. 1 through 4, inclusive, the rear signalling light 51, mounted on the vehicle's deck lid 52, is of the same type construction as the front signalling light 48, i.e. a dual filament lamp 56 mounted in a housing with a focusing reflector. The rear signalling light 51 can be offered separately or in combination with the front signalling light 48. If a vehicle is equipped with only the rear signalling light 51, the same driver's switch 61 is used as previously described for the front signalling light 48 of FIGS. 26 through 28.

Figure 34:
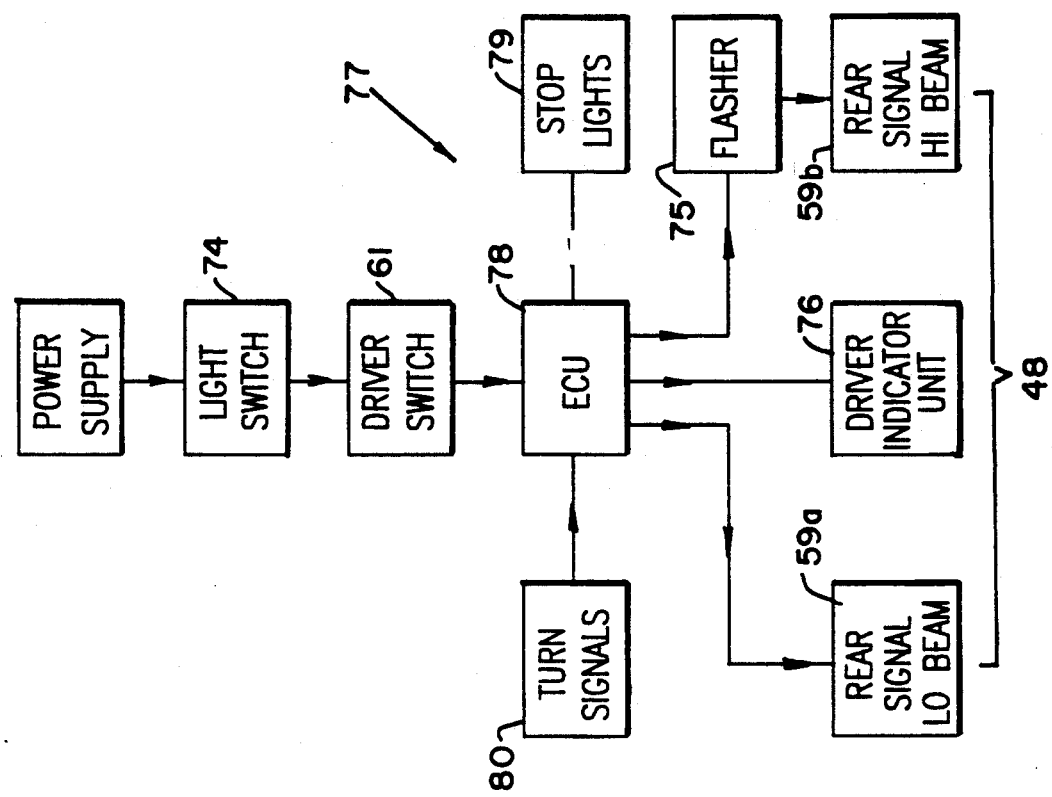
FIG. 34 is a block diagram of a control system for operating a rear signalling light to signal drivers behind a vehicle to dim or turn on their vehicles' headlights.

A control circuit 77 for the rear signalling light 51 is shown in FIG. 34. The control circuit 77 is comprised of the driver's switch 61 in series with the vehicle's headlight switch 74, an electronic control unit 78 (ECU) in series with the driver's switch 61, a flasher unit 75 in series with the ECU 78, and the rear signalling light 51. The ECU 78 includes a timer and circuitry to prevent operation of the rear signalling light 51 if the vehicle's rear stop lights 79 or rear turn signal lights 80 are operating. This is desirable to avoid confusion by a simultaneous operation of all of the rear lights. The low intensity filament 59a of the dual filament lamp 56 is fed directly by the driver's switch 61 and transmits a non-flashing light beam when the system is operating. The high intensity filament 59b of the dual filament lamp 56 is fed by the flasher unit 75 and continues to flash when the system is operating. The timer 73 serves the same function as previously described for the front signalling light 48, i.e. to regulate the system to operate for a pre-determined interval of time.

Referring now to FIGS. 29 through 30, inclusive, a driver's switch 81 is shown for operating a signalling system having both front 48 and rear 51 signalling lights. The driver's switch 81 is a double pole double throw (DPDT) switch 81 and is mounted on a non-rotatable portion 82 of a vehicle's steering column 83. The switch 81 is a conventional rocker switch of the type commonly used for raising and lowering power operated vehicle windows. The rocker 84 is spring biased to return to a normally off center position 85. The front signalling light 48 is activated by moving the rocker 84 to the foremost travel position 86 and the rear signalling light 51 is selectively operated by moving the rocker 84 to the rearmost travel position 87. If the rocker 84 is momentarily held in the foremost position 86 or rearmost position 87 and released, the switch 81 will return to the normally open position 85.

Figure 35:
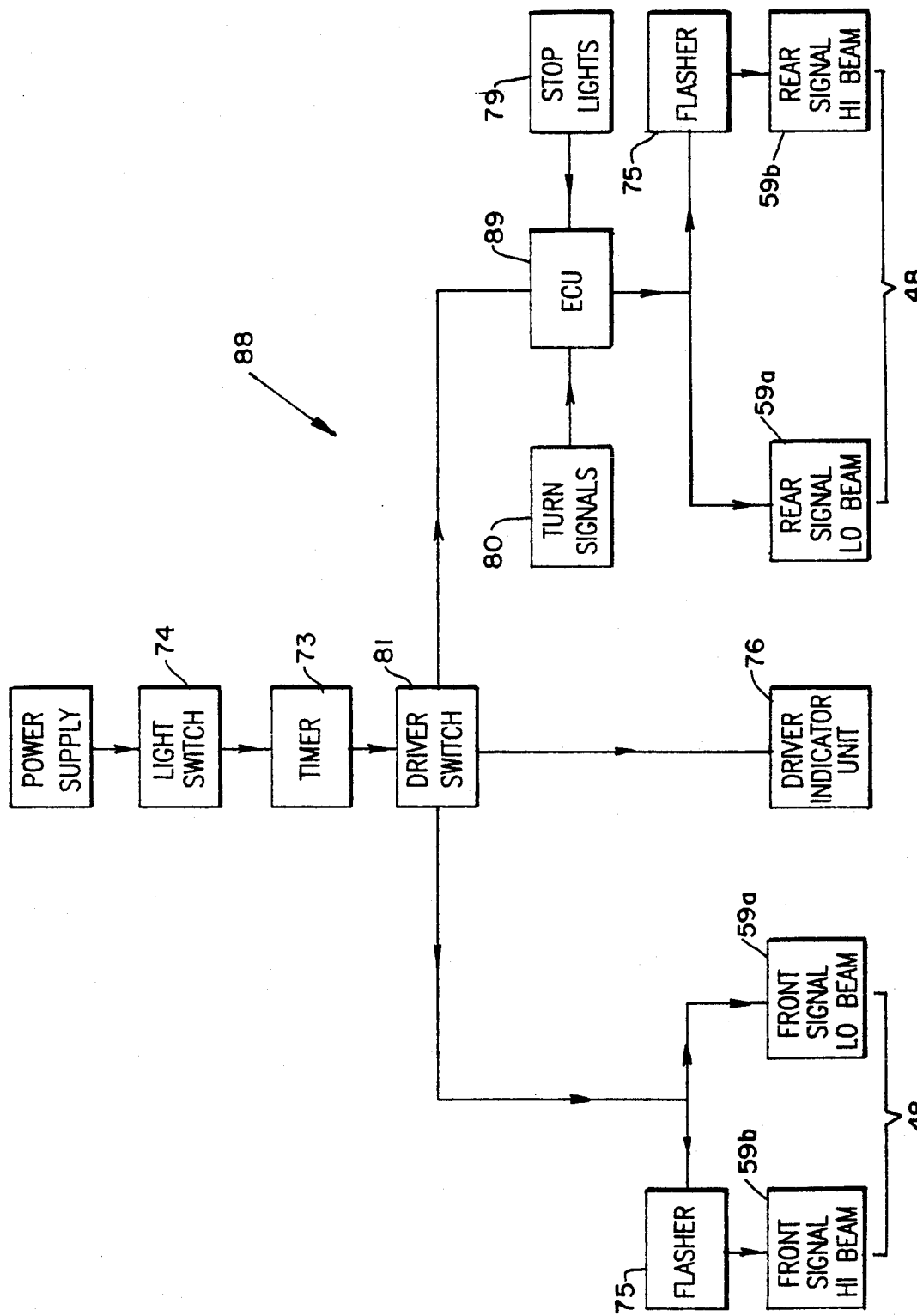
FIG. 35 is a block diagram of a control system for operating front and rear signalling lights to signal drivers of oncoming vehicles and rearward vehicles to dim or turn on their vehicles headlights.

With reference to FIG. 35, a control circuit 88 is shown for a combined front 48 and rear 51 signalling light system. The DPDT driver's switch 81 is connected in series with a timer 73 which is in series with the vehicle's light switch 74. In the foremost position 86 of the rocker 84, the switch 81 supplies current to the front signalling light 48 in same manner as the control circuit 77 of FIG. 33. In the rearmost position 87 of the rocker 84 the switch 81 supplies current via an ECU 89 to the rear signalling light 51 in a similar manner to the control circuit 77 of FIG. 34, the difference being that in FIG. 34 a timer is included in the ECU 89. As previously described, the front signalling light 48 is activated by moving the rocker 84 to the foremost travel position 86 and the rear signalling light 51 is selectively operated by moving the rocker 84 to the rearmost travel position 87. If the rocker 84 is momentarily held in the foremost 86 or rearmost 87 positions and released, the switch 81 will return to the normally open position 85.

It will be appreciated that, by a re-location of the signalling lights, a substitution or re-arrangement of components and changes in the mode of operating the signalling lights, other embodiments can be provided without departing from the spirit of my invention. For example, a single filament lamp can be substituted for the dual filament lamp and the low intensity light beam eliminated. Also, a colored lamp or filter can be provided to transmit a colored signalling light beam. The use of colored lamps and filters was disclosed in my prior patent applications which are incorporated herein by reference. When a colored light beam is transmitted, colors such as green and violet are preferable which distinguish them from other vehicle and traffic lights.

It is not my intention to limit my signalling system to a particular embodiment, since the selection of an embodiment will depend on styling, cost, state and federal laws. By way of illustrating the wide scope of my invention, I have included the following other embodiments for my signalling system.

In FIGS. 7 through 9, inclusive, a front signalling light 90 is shown mounted on the hood 91 of a motor vehicle 40. The signalling light 90 is comprised of a housing 92, a dual filament lamp 56, a socket 57 for receiving the lamp 56, a collimating lens 95 for focusing the signalling light beam and a light filter 96 for transmitting a colored light beam 49. The lamp 56 is positioned in the housing 92 to project a light beam 49 at an angle with respect to the vehicle's longitudinal axis 50. One advantage of the collimating lens 95 is a reduction in size of the signalling light 90 without a reduction in the intensity of the signalling light beam.

In FIGS. 10 through 13, a rotatively mounted front signalling light 97 is shown on the top of the vehicle's instrument panel 98. The signalling light 97 can be rotated to point the light beam at a vehicle. The signalling light 97 comprises a housing 99, a dual filament lamp 56 inside of the housing 99, a lamp socket 57 mounted in the housing 99 for receiving the lamp 56, a collimating lens 100 for focusing a signalling light beam emitted by the lamp 56, a threaded bushing 101, a hex nut 102 and a stationary base 103. The housing 99 is attached to the base 103 with the threaded bushing 101 and hex nut 102 to provide a passage for routing electrical wires 104.

In FIGS. 14 through 17, inclusive, a rear signalling light 105 is shown mounted on the top of a telescoping mast 106 which is mounted on the left rear fender 108 of a motor vehicle 40. The signalling light 105 is comprised of a transparent spherical housing 109 mounted on the top of the mast 106, a lamp socket 57, a dual filament signalling lamp 56 and a hemi-spherical shield 110 on the forward side of the housing 109. At the base of the mast 106, inside of the vehicle's rear fender 108, there is a drive unit 111 of the type commonly used for raising and lowering a power operated radio antennae. When the driver's switch 61 is closed, the signalling light 105 is simultaneously raised and transmits flashing signals. When the spring biased switch 61 is returned to its normally off position, the light 105 is simultaneously lowered and transmits flashing signals. If the switch 61 is held in a closed position, the light 105 continues to be raised and lowered and transmits flashing signals.

Figure 24:
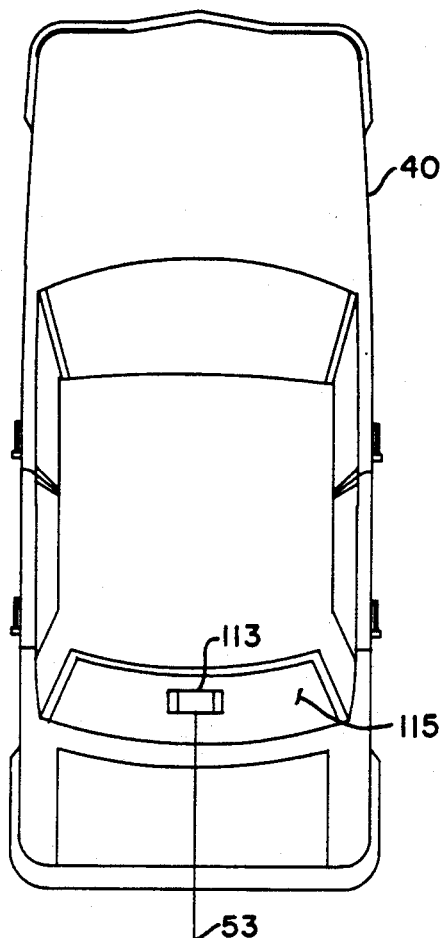
FIG. 24 is a plan view of an alternate embodiment having a signalling light mounted in a common housing with a stop light on a vehicle package tray for signalling drivers of vehicles behind the signalling vehicle to dim or turn on their vehicles' headlights.
Figure 25:
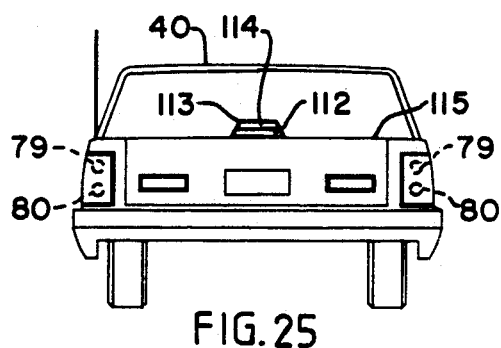
FIG. 25 is a rear view of the vehicle shown in FIG. 25.

In FIGS. 24 and 25, a rear signalling lamp 112 is shown mounted in a housing 113 with an "eye level" stop light 114 on top of the vehicle's package tray 115. This arrangement was disclosed and described in my applications incorporated herein by reference. The "eye level" stop light housing 113 is in a desirable location for gaining the attention of a driver because it is easily seen by the driver and is remote from the other vehicle lights.

Figure 18:
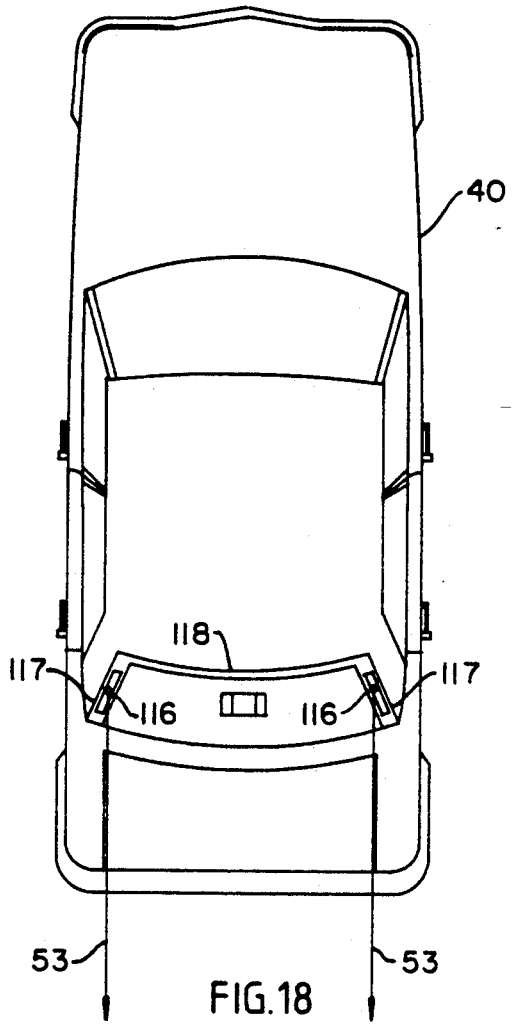
FIG. 18 is a plan view of an alternate embodiment having a pair of signalling lights mounted in the vertical side portions of a rear window molding for signalling drivers of vehicles behind the signalling vehicle to dim or turn on their vehicles' headlights.
Figure 20:
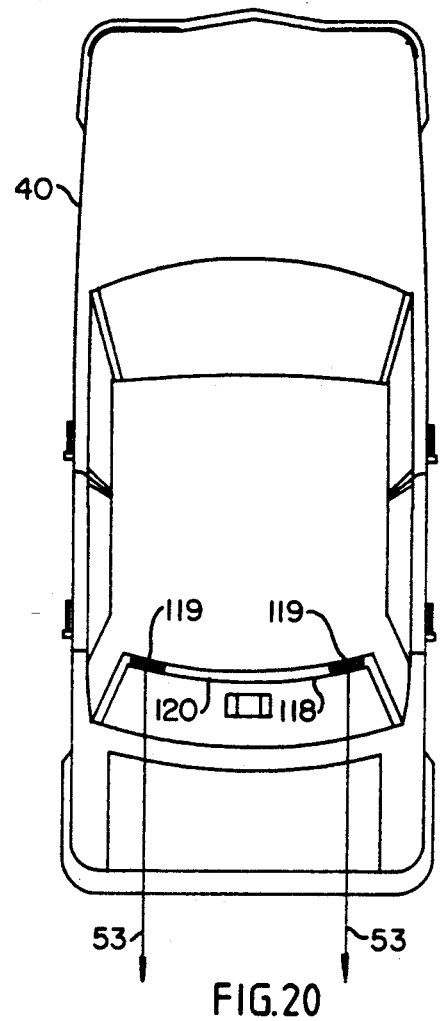
FIG. 20 is a plan view of an alternate embodiment having a pair of signalling lights mounted in the horizontal upper portion of a rear window molding for signalling drivers of vehicles behind the signalling vehicle to dim or turn on their vehicles' headlights.
Figure 19:
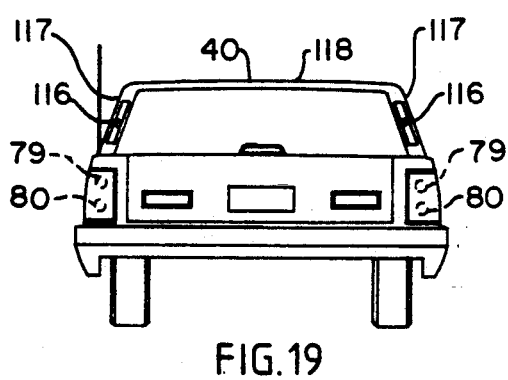
FIG. 19 is a rear view of the vehicle shown in FIG. 18.
Figure 21:
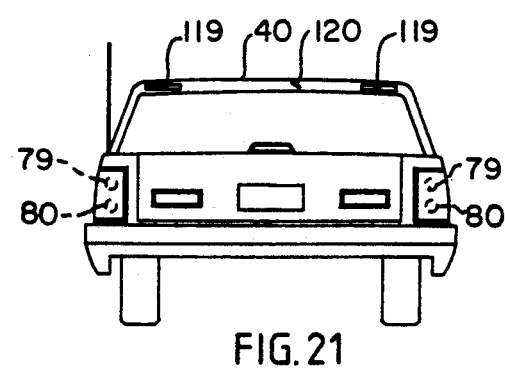
FIG. 21 is a rear view of the vehicle shown in FIG. 20.

In FIGS. 18 and 19, a pair of rear signalling lights 116 are shown mounted in the vertical side portions 117 of a rear window molding 118 for transmitting a pair of signalling beams 51. In FIGS. 20 and 21, a pair of rear signalling lights 119 are shown mounted in the horizontal upper portion 120 of the vehicle's rear window molding 118 for transmitting a pair of signalling beams 51.

Figure 22:
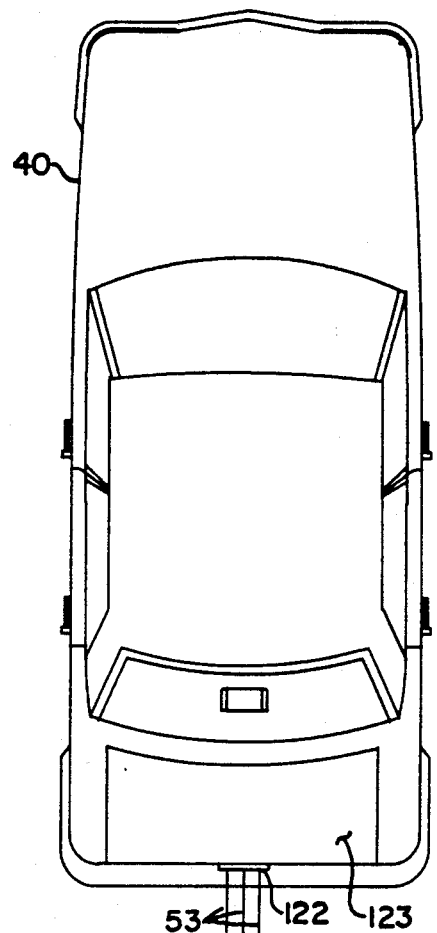
FIG. 22 is a plan view of an alternate embodiment having three signalling lights mounted in the rear deck lid of a vehicle for signalling drivers of vehicles behind the signalling vehicle to dim or turn on their vehicles' headlights.
Figure 23:
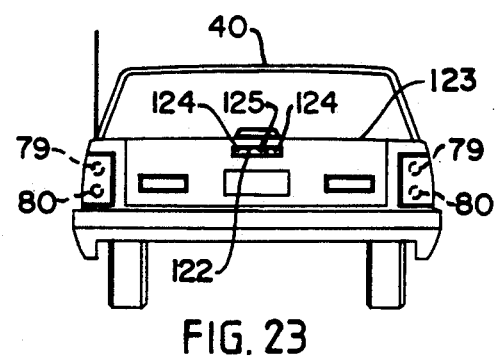
FIG. 23 is a rear view of the vehicle shown in FIG. 22.
Figure 32:
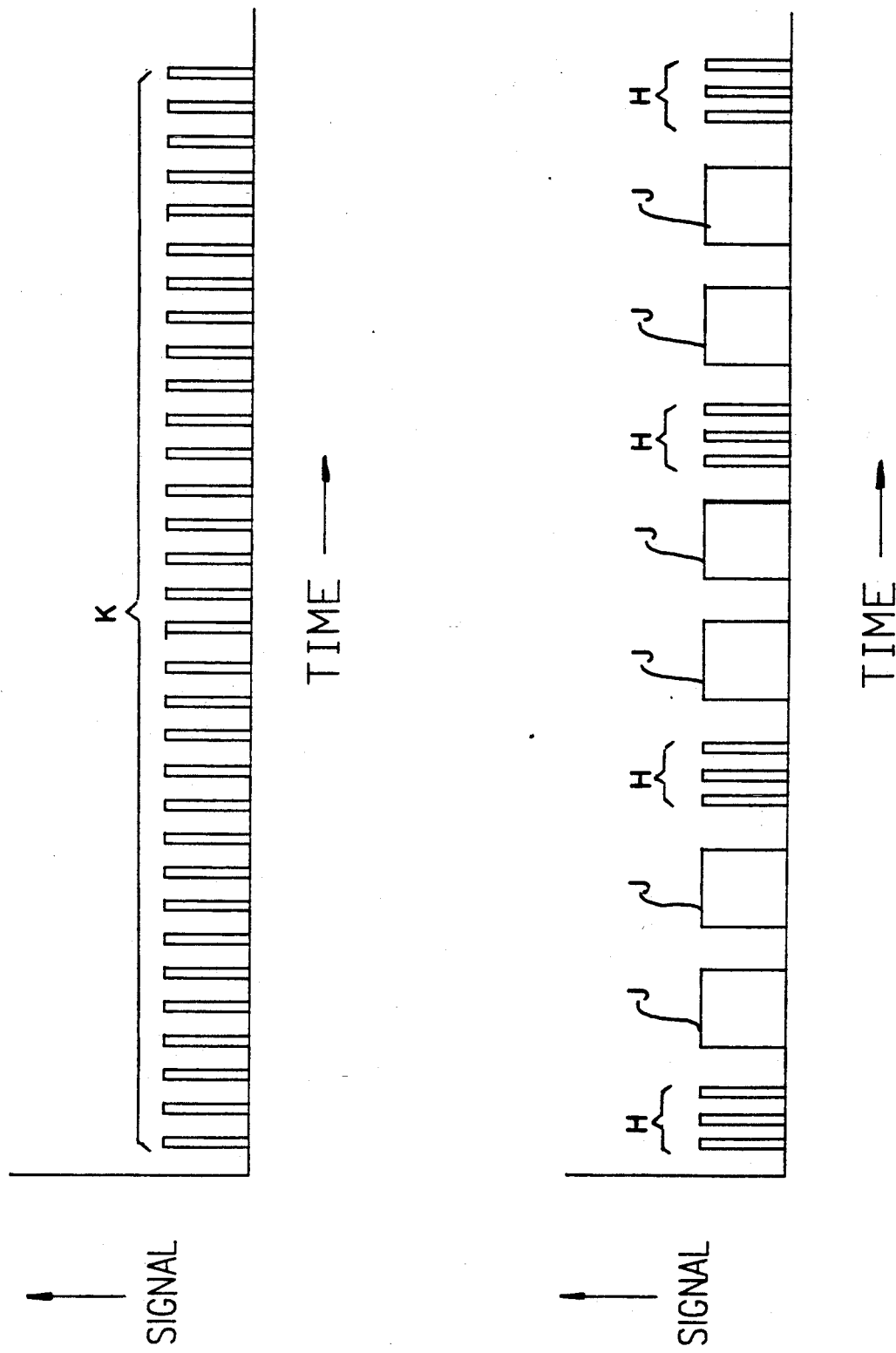
FIG. 32 is a graph of an output of the signalling system shown in FIGS. 22 and 23, inclusive.

Referring now to FIGS. 22 and 23 three signalling lights 122 are shown in a common housing mounted on an upper vertical portion of the vehicle's deck lid 123 for transmitting three parallel signalling beams 51. Several options can be used for operating the three signalling lights 122. One option is to flash the outer lights 124 at one rate and pulse width and then the center 125 light at another rate and pulse width. This signalling pattern is illustrated in FIG. 32 wherein the outer lights 124 are designated by the letter "H" and the center light 125 is designated by the letter "J". Another option is to flash the outer 124 and center 125 lights alternately at the same rate and pulse width. This signalling pattern is also shown in FIG. 32 and is designated by the letter "K". Moreover, the outer lights 124 can be colored, by way of example, green or violet, to further distinguish the signalling lights 124 from other vehicle lights.

Figure 36:
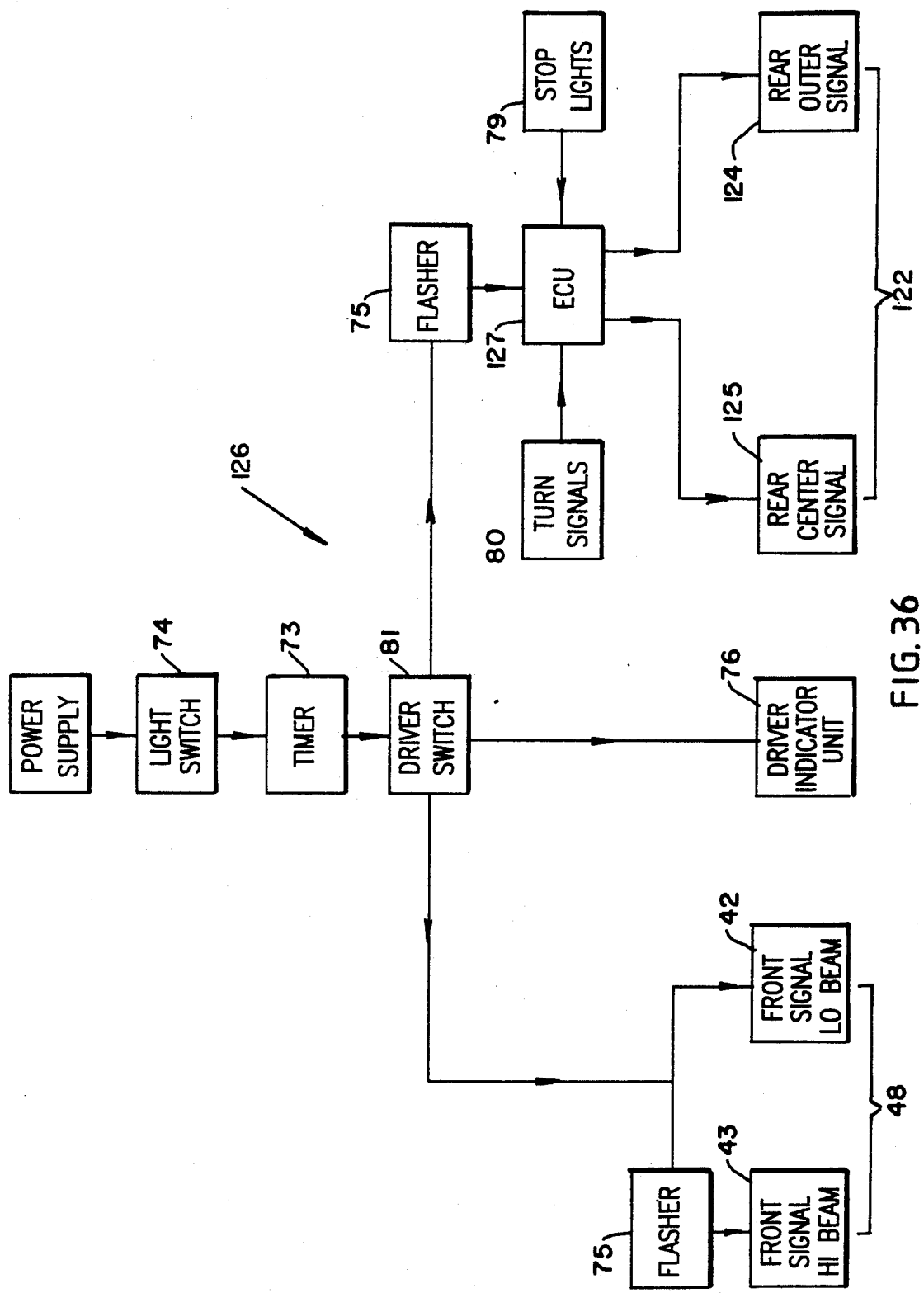
FIG. 36 is a block diagram of a control system for operating three signalling lights to signal drivers behind a vehicle to dim or turn on their vehicles' headlights.

A control system 126 for operating a front signalling light 48 and the three rear signalling lights 112 of FIGS. 22 and 23 is illustrated in FIG. 36. The control circuit 126 is similar to the control circuit of FIG. 35 except for the substitution of the outer 124 and center 125 lights for the rear low intensity 59a and high intensity 59b lights and a modified ECU 127 which is adapted to provide the flashing pattern of rear signalling lights 122.

Figure 37:
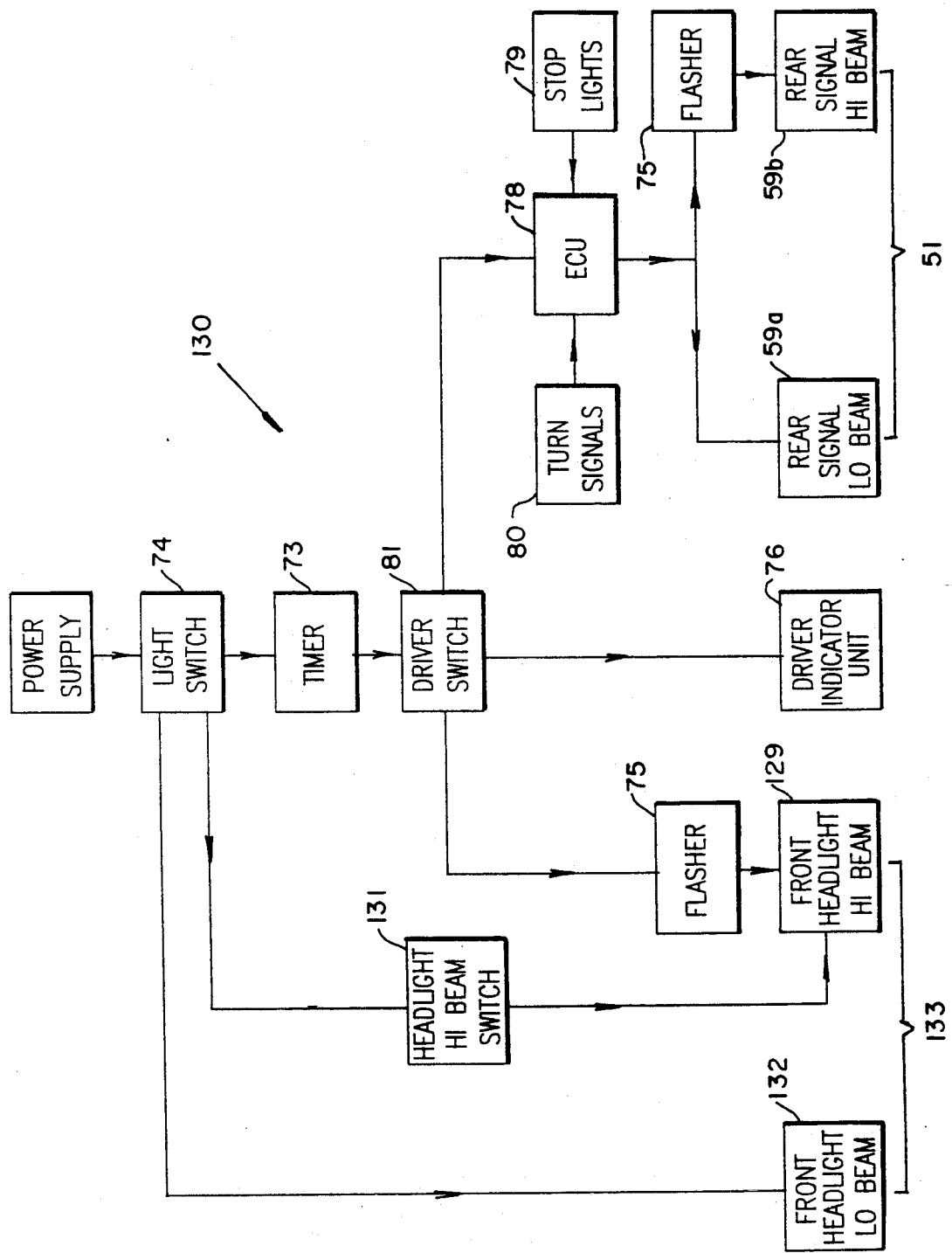
FIG. 37 is a block diagram of a control system for operating a front high-beam headlight to signal drivers of oncoming vehicles to dim or turn on their vehicles' headlights.

In FIG. 37, an embodiment is shown which is a variation of FIG. 35. A left high-beam headlight 131 is used in lieu of the front signalling light 48 and flashed to request a driver to dim or turn on his headlights. The flashing high-beam headlight 129 is used with an existing low-beam headlight 132 for transmitting a flashing signalling beam 138. The high-beam headlight 129 receives current from a flasher 75 which is wired in parallel with an existing high-beam headlight switch 131. Although this arrangement is not preferable, it can used in conjunction with the rear signalling light 51. The control circuit 130 is the same as the control circuit 88 of FIG. 35 except for the substitution of the left high-beam headlight 129 for the front signalling light 48.

From the foregoing, it will be understood that my invention provides a means for improving driver safety and reducing driver stress. Moreover, my invention is low in cost and can be readily incorporated into new vehicles.

I claim:

1. In a motor vehicle of the type having a pair of front low-beam headlights, a pair of front high-beam headlights, a pair of rear stop lights and a pair of rear turn signal lights, the improvement comprising a signalling light mounted on the front of said vehicle for transmitting a flashing high intensity light beam forwardly repeatedly "on" and "off" to signal a driver of an oncoming vehicle to dim or turn on his vehicle's headlights; a signalling light mounted on the rear of said vehicle for transmitting a flashing high intensity light beam rearwardly "on" and "off" to signal a driver of a vehicle behind said vehicle having said signalling light to dim or turn on his vehicle's headlights; and a control system for selectively operating said front and said rear signalling lights, said control system having two operating states, a first operating state wherein said signalling lights automatically flash "on" and "off" repeatedly for a predetermined interval of time and a second manual operating state wherein said signalling lights repeatedly flash "on" and "off" continuously.

2. The signalling system recited in claim 1 wherein said means for flashing each of said signalling lights "on" and "off" for a predetermined interval of time comprises a timer and a spring biased normally open switch.

3. The signalling system recited in claim 1 wherein said front signalling light is mounted in the left front corner of said vehicle.

4. The signalling system recited in claim 1 further comprising said front signalling light having a signalling lamp oriented in said signalling light for transmitting a signalling light beam forwardly and outwardly away from said vehicle having said signalling light.

5. The signalling system recited in claim 4 further comprising said signalling lamp being oriented in said signalling light for transmitting said signalling light beam along an axis which is at an angle of more than zero degrees and less than 30 degrees with respect to the longitudinal axis of said vehicle having said front signalling light.

6. The signalling system recited in claim 5 wherein said angle between said signalling light beam axis and said vehicle's longitudinal axis is about 15 degrees.

7. The signalling system recited in claim 1 further comprising a means in said front signalling light for transmitting a flashing colored light beam to said oncoming vehicle.

8. The signalling system recited in claim 1 further comprising a means in said rear signalling light for transmitting a flashing colored light beam to said vehicle behind said signalling vehicle.

9. The signalling system recited in claim 1 further comprising a means for rotatively mounting said front signalling light on said vehicle to selectively aim said signalling light beam in the direction of said oncoming vehicle.

10. The signalling system recited in claim 1, said vehicle having a hood on the front of said vehicle and further comprising said front signalling light being mounted on said hood.

11. The signalling system recited in claim 1, said vehicle having an instrument panel in the interior of said vehicle and further comprising said signalling light being mounted on said instrument panel.

12. The signalling system recited in claim 1 further comprising a means in at least one of said signalling lights for focusing said signalling light's beam.

13. The signalling system recited in claim 1 further comprising a parabolic reflector in at least one of said signalling lights for focusing said signalling light's beam.

14. The signalling system recited in claim 1 further comprising a collimating lens in at least one of said signalling lights for focusing said signalling light's beam.

15. The signalling system recited in claim 1 further comprising at least one of said signalling lights having a pair of filaments, one filament for transmitting a high intensity light beam and another of said filament for transmitting a low intensity light beam; and said control system being adapted to flash said high intensity light beam "on" and "off".

16. The signalling system recited in claim 1 further comprising a driver's switch for initiating operation of said signalling system, said driver's switch having one position for signalling a driver of an oncoming vehicle to dim or turn on his vehicle's headlights; and another position for signalling a driver of a vehicle behind said signalling vehicle to dim or turn on his vehicle's headlights.

17. The signalling system recited in claim 1 further comprising said control system being adapted for flashing at least one of said signalling lights "on" and "off" at a constant frequency.

18. The signalling system recited in claim 1 further comprising a means for informing the driver of the signalling vehicle that either of said signalling lights is operating.

19. The signalling system recited in claim 18 wherein said means for informing said driver is a light.

20. The signalling system recited in claim 19 wherein said means for informing said driver produces an audible means.

21. The signalling system recited in claim 1, said vehicle having a deck lid at the rear of said vehicle further comprising said rear signalling light being mounted on said deck lid.

22. The signalling system recited in claim 1 further comprising said rear signalling light having more than one signalling light on the rear of said signalling vehicle for transmitting more than one signalling light beam to said vehicle behind said signalling vehicle.

23. The signalling system recited in claim 1, said vehicle having a steering column in the interior of said vehicle and further comprising a driver's switch mounted on said steering column for initiating operation of said signalling lights.

24. The signalling system recited in claim 23, said steering column having a transmission gear selector lever rotatively mounted on said steering column and further comprising said driver's switch being mounted on an end portion of said lever.

25. The signalling system recited in claim 1, said vehicle having a rear window molding with side vertical portions and an upper horizontal portion and further comprising said rear signalling light having a pair of signalling lamps, one of said lamps being mounted in one of said molding vertical side portions and the other of said lamps being mounted in the other of said molding vertical side portions.

26. The signalling system recited in claim 1, said vehicle having a rear window molding with side vertical portions and an upper horizontal portion and further comprising said rear signalling light having a pair of signalling lamps mounted in said molding horizontal portion.

27. The signalling system recited in claim 1, said vehicle having a left rear fender, said system further comprising said rear signalling light mounted on said rear fender, said signalling light comprising a vertical mast, a spherical transparent housing mounted on the upper end portion of said mast, a lamp socket mounted inside of said housing, a lamp mounted in said socket and a hemi-spherical shield covering the forward side of said housing.

28. The signalling system recited in claim 27 further comprising a power means for telescoping said mast upwardly and downwardly to raise and lower said signalling light.

29. The signalling system recited in claim 28 further comprising a means for flashing said signalling light "on" and "off" during the raising and lowering of said signalling light.

30. The signalling system recited in claim 1, said vehicle having a rear package tray and a housing mounted on said package tray for an "eye" level stop light and further comprising said rear signalling light being mounted in the interior of said housing.

31. The signalling system recited in claim 1 further comprising a means in said control system for preventing said signalling light from operating when said rear stop lights or said rear turn signal lights are operating.

32. The signalling system recited in claim 1 further comprising a means for preventing said signalling system from operating when said vehicle headlights are not operating.

33. In a motor vehicle of the type having a pair of front low-beam headlights, a pair of front high-beam headlights, a pair of rear stop lights, a pair of rear turn signal lights and a switch for operating said headlights, the improvement comprising: a front signalling light mounted in the left front corner of said vehicle for repeatedly transmitting a flashing high intensity signalling light beam forwardly and outwardly from said vehicle to request a driver of an oncoming vehicle to dim or turn on his vehicle's headlights without disturbing drivers of other vehicles, said signalling light including a housing mounted in the left front corner of said vehicle and open at the forward end portion thereof, said housing having a parabolic portion for focusing said signalling light beam, a lamp, mounted inside of said housing, having at least one filament for generating said light beam, a socket mounted in said housing for receiving said lamp; a lens mounted to said housing for covering said open end portion; and a control system for operating said signalling light, said control system having two operating states, a first automatic operating state wherein said high intensity signalling lights repeatedly flash "on" and "off" for a predetermined interval of time and a second manual operating state wherein said high intensity signalling lights repeatedly flash "on" and "off" continuously.

34. The signalling system recited in claim 33 further comprising said control system having a timer for regulating said signalling system to automatically transmit said signalling light beam during a predetermined interval of time, said timer having an input connected in series with said vehicle's light switch and an output connected in series with a switch for activating said signalling system, a switch for activating said signalling system, said switch having an input connected in series with said timer's output and an output connected in series with a flasher, a flasher for flashing said signalling light beam repeatedly "on" and "off", said flasher having an input connected in series with said timer's output and an output connected in series with said signalling lamp.

35. The signalling system recited in claim 34 further comprising an indicating means mounted in the interior of said vehicle for informing a driver that said signalling system is operating, said indicating means having an input connected in series with said output of said switch.

36. The signalling system recited in claim 33 further comprising said lamp having a low intensity filament.

37. The signalling system recited in claim 36 further comprising said control system having a timer for regulating said signalling system to repeatedly transmit said flashing signalling light beam during a predetermined interval of time, said timer having an input connected in series with said vehicle's light switch and an output connected in series with a switch for activating said signalling system, a switch for activating said signalling system, said switch having an input connected in series with said timer's output, a first output connected in series with said low intensity filament of said lamp, a second output connected in series with a flasher and a third output connected in series with an indicating unit, a flasher for repeatedly flashing said signaling light beam "on" and "off", said flasher having an input connected in series with said switch's second output and an output connected in series with said signalling lamp, and an indicating means mounted in the interior of said vehicle for informing a driver that said signalling system is operating, said indicating means having an input connected in series with said switch's third output.

38. In a motor vehicle of the type having in the rear of said vehicle a pair of stop lights, a pair of turn signal lights and a deck lid, the improvement comprising: a rear signalling light mounted on the rear of said vehicle for signalling a driver of a vehicle behind the signalling vehicle to dim or turn on his vehicle's headlights, said signalling light having a lamp, said lamp having a pair of filaments, one of said filaments being adapted for transmitting a high intensity light beam and the other of said filaments being adapted for transmitting a non-flashing signalling low intensity light beam, and a control system for regulating said lamp to transmit a flashing high intensity light beam simultaneously with a low intensity light beam, said control system having two operating states, a first automatic operating state wherein said signalling light repeatedly flashes "on" and "off" for a predetermined interval of time and a second manual operating state wherein said signalling light repeatedly flashes "on" and "off" continuously.

39. The signalling system recited in claim 38 further comprising a spring biased normally open single pole single throw switch for activating said signalling system.

40. The signalling system recited in claim 39, said vehicle having a transmission gear selector lever assembly mounted on a steering column, said transmission selector lever comprising a tubular lever and a knob mounted on an end of said lever, said switch for activating said system comprising said knob having an aperture extending through the center of said knob, a push button slideably mounted in said aperture of said knob, an upper contact mounted on an inner end portion of said push button, a lower contact assembly, said lower contact assembly having an insulator and a pair of contacts, and a spring for biasing said push button outwardly.

41. The signalling system recited in claim 38 further comprising said signalling light having a filter for transmitting a colored signalling light beam.

42. The signalling system recited in claim 40 further comprising a means for preventing said rear signalling light from transmitting a signalling light beam when either of said vehicle's stop lights or turn signal lights are operating.

43. The signalling system recited in claim 40 further comprising a signalling light mounted on the front end of said vehicle for signalling a driver of an oncoming vehicle to dim or turn on his vehicle's headlights.

44. In a motor vehicle of the type having in the rear of said vehicle a pair of stop lights, a pair of turn signal lights and a deck lid, the improvement comprising: at least one signaling system for signalling a driver of another vehicle to dim or turn on his vehicle's headlights, said signalling system comprising a means for repeatedly transmitting a flashing light beam to a driver of another vehicle, a means for transmitting a non-flashing light beam to said driver of said other vehicle simultaneously with said flashing light beam and a control system, said control system including a switch in the interior of said signalling vehicle for enabling a driver of said vehicle to activate said signalling system and having two operating states, a first automatic operating state wherein said signalling light repeatedly flashes "on" and "off" for a predetermined interval of time and a second manual operating state wherein said signalling light repeatedly flashes "on" and "off" continuously.

45. The signalling system recited in claim 44 wherein said means for transmitting said flashing and non-flashing light beams comprises a dual filament lamp mounted inside of a housing with an "eye level" stop light.

46. In a motor vehicle of the type having in the rear of said vehicle a pair of turn signal lights and a pair of stop lights, the improvement comprising: a rear signalling light mounted on the rear of said vehicle for signalling drivers of vehicles behind said signalling vehicles to dim or turn on their vehicle's headlights, said signalling light comprising a pair of outer signalling lamps and a center signalling lamp; a switch mounted in the interior of said signalling vehicle for enabling a driver to activate said signalling system; and a control system for controlling the operation of said signalling system, said control system having a means for repeatedly alternately flashing said outer signalling lamps and said center signalling lamp to distinguish said signalling lights repeatedly flash "on" and "off" for a predetermined interval of time and a second manual operating state wherein said signalling lights repeatedly flash "on" and "off " continuously.

47. The signalling system recited in claim 46 further comprising said signalling lamps being halogen lamps.

48. The signalling system recited in claim 46, further comprising said control system having an electronic control unit for preventing said signalling lamps from transmitting signals when said stop lights or said turn signal lights are operating and for regulating said signalling system to transmit said signalling light beam during a predetermined interval of time.

49. The signalling system recited in claim 46 further comprising a means for coloring the said light beam transmitted by said outer signalling lamps.

* * * * *

UNITED STATES PATENT AND TRADEMARK OFFICE
CERTIFICATE OF CORRECTION

PATENT NO. : 5,237,306
DATED : August 17, 1993
INVENTOR(S) : Robert Adell

It is certified that error appears in the above-identified patent and that said Letters Patent is hereby corrected as shown below:

Column 3, line 1, change "propertly" to --property--

Column 4, line 40, change "vehicles" to --vehicles'--

Column 9, line 35, change "138" to --133--

Column 13, line 5, change "signaling" to --signalling--

Column 14, line 40, after "distinguish" add --said signalling lights from other vehicle and traffic lights and two operating states, a first automatic operating state wherein--

Signed and Sealed this

Fifth Day of April, 1994

*Attest:*

BRUCE LEHMAN

*Attesting Officer*  *Commissioner of Patents and Trademarks*